(12) United States Patent
Wagman et al.

(10) Patent No.: US 9,735,629 B2
(45) Date of Patent: Aug. 15, 2017

(54) ELECTROMAGNETIC ALIGNMENT OF INDUCTIVE COILS

(71) Applicant: Apple Inc., Cupertino, CA (US)

(72) Inventors: Daniel C. Wagman, Cupertino, CA (US); Christopher S. Graham, Cupertino, CA (US); Eric S. Jol, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 217 days.

(21) Appl. No.: 14/288,949

(22) Filed: May 28, 2014

(65) Prior Publication Data

US 2015/0349571 A1    Dec. 3, 2015

(51) Int. Cl.
*H02J 7/00* (2006.01)
*H01F 27/42* (2006.01)
*H01F 37/00* (2006.01)
*H01F 38/00* (2006.01)
*H02J 50/90* (2016.01)

(52) U.S. Cl.
CPC .................. *H02J 50/90* (2016.02)

(58) Field of Classification Search
CPC .. H02J 7/025; H02J 5/005; H02J 50/10; H02J 50/12; H02J 50/80; H02J 50/90; H02J 5/00; H02J 5/05; H02J 7/02; H02J 17/00
USPC .......................................... 320/108; 307/104
See application file for complete search history.

(56) References Cited

U.S. PATENT DOCUMENTS

| | | | |
|---|---|---|---|
| 7,477,039 B2 | 1/2009 | Rodarte et al. | |
| 7,710,071 B2* | 5/2010 | Elizalde Rodarte | H02J 7/0044 310/50 |
| 7,948,208 B2 | 5/2011 | Partovi et al. | |
| 7,952,322 B2 | 5/2011 | Partovi et al. | |
| 8,049,370 B2* | 11/2011 | Azancot ................ | H01F 38/14 307/104 |
| 8,169,185 B2 | 5/2012 | Partovi et al. | |
| 8,248,025 B2 | 8/2012 | Sip | |
| 8,497,657 B2 | 7/2013 | Franks et al. | |
| 8,629,652 B2 | 1/2014 | Partovi et al. | |
| 8,629,654 B2 | 1/2014 | Partovi et al. | |
| 8,890,470 B2* | 11/2014 | Partovi ................ | H01F 7/0252 320/108 |
| 8,896,264 B2 | 11/2014 | Partovi | |
| 8,901,881 B2 | 12/2014 | Partovi | |
| 8,912,686 B2 | 12/2014 | Stoner et al. | |
| 8,947,047 B2 | 2/2015 | Partovi et al. | |
| 9,106,083 B2 | 8/2015 | Partovi | |
| 9,112,362 B2 | 8/2015 | Partovi | |
| 9,112,363 B2 | 8/2015 | Partovi | |
| 9,112,364 B2 | 8/2015 | Partovi | |

(Continued)

FOREIGN PATENT DOCUMENTS

| | | |
|---|---|---|
| EP | 0977297 | 2/2000 |
| WO | WO2009105615 | 8/2009 |
| WO | WO2013035282 | 3/2013 |

*Primary Examiner* — Richard Isla Rodas
*Assistant Examiner* — Michael Dibenedetto
(74) *Attorney, Agent, or Firm* — Kilpatrick Townsend & Stockton LLP (57) ABSTRACT

Methods and systems for automatically aligning a power-transmitting inductor with a power-receiving inductor. One embodiment includes a method of applying a direct current pulse to a transmit coil of a power-transmitting inductor to attract the power-receiving inductor into alignment along an alignment axis.

25 Claims, 8 Drawing Sheets

(56) References Cited

U.S. PATENT DOCUMENTS

| | | |
|---|---|---|
| 9,178,369 B2 | 11/2015 | Partovi |
| 9,325,200 B2 * | 4/2016 | Nishiwaki ............... H02J 17/00 |
| 2011/0050164 A1 | 3/2011 | Partovi et al. |
| 2011/0221385 A1 | 9/2011 | Partovi et al. |
| 2012/0112553 A1 * | 5/2012 | Stoner, Jr. ............... H02J 5/005 |
| | | 307/104 |
| 2012/0164849 A1 | 6/2012 | Lee et al. |
| 2012/0315771 A1 | 12/2012 | Greig et al. |
| 2013/0093388 A1 | 4/2013 | Partovi |
| 2013/0099563 A1 | 4/2013 | Partovi et al. |
| 2013/0249479 A1 | 9/2013 | Partovi |
| 2013/0260677 A1 | 10/2013 | Partovi |
| 2013/0271069 A1 | 10/2013 | Partovi |
| 2013/0285604 A1 | 10/2013 | Partovi |
| 2013/0285605 A1 | 10/2013 | Partovi |
| 2013/0300204 A1 | 11/2013 | Partovi |
| 2013/0316549 A1 | 11/2013 | DiFonzo et al. |
| 2014/0103873 A1 | 4/2014 | Partovi et al. |
| 2014/0132207 A1 * | 5/2014 | Fisher ................... H02J 7/0052 |
| | | 320/108 |
| 2014/0132210 A1 | 5/2014 | Partovi |
| 2014/0191568 A1 | 7/2014 | Partovi |
| 2014/0217970 A1 | 8/2014 | Tabata et al. |
| 2014/0306654 A1 | 10/2014 | Partovi |
| 2015/0130412 A1 | 5/2015 | Partovi |
| 2015/0145475 A1 | 5/2015 | Partovi et al. |
| 2015/0270046 A1 | 9/2015 | Golko et al. |
| 2015/0280483 A1 * | 10/2015 | Golko ..................... H02J 7/025 |
| | | 320/108 |
| 2015/0318709 A1 * | 11/2015 | Jol ......................... H02J 5/005 |
| | | 307/104 |
| 2016/0336817 A1 * | 11/2016 | Jabori ............... H04M 1/72569 |

* cited by examiner

ELECTROMAGNETIC ALIGNMENT OF INDUCTIVE COILS

TECHNICAL FIELD

Embodiments described herein relate to electromagnetic power transfer systems, and in particular to systems and methods for improving alignment of an inductive power transmitter to an inductive power receiver.

BACKGROUND

Portable electronic devices may include one or more batteries that may require recharging from time to time. Such devices may include electric vehicles, cell phones, smart phones, tablet computers, laptop computers, wearable devices, navigation devices, sports devices, health devices, medical devices, location tracking devices, accessory devices, home appliances, peripheral input devices, remote control devices, and so on.

Some batteries may recharge wirelessly by accepting inductive power provided by an inductive power transmitter. For instance, a battery-powered electronic device configured to accept inductive power may be placed nearby a transmitter adapted to produce inductive power. In these systems, a transmitting coil within the transmitter may produce a time-varying electromagnetic flux that may induce a current within a receiving coil within the device. The received current may be used to replenish the charge of a rechargeable battery.

In many examples, imperfect alignment of the transmitting coil and receiving coil may result in power transfer efficiency losses.

Accordingly, there may be a present need for a system and method for aligning coils of an electromagnetic power transfer system.

SUMMARY

Embodiments described herein may relate to, include, or take the form of methods and systems for aligning a power-transmitting inductor with a power-receiving inductor.

For example, certain embodiments may relate to a method of aligning an inductive power transmitter with an inductive power receiver, including at least the steps of determining if the inductive power receiver is in contact with the inductive power transmitter and determining if the inductive power receiver is aligned along an alignment axis with the inductive power transmitter. Thereafter, if the embodiment determines that the inductive power receiver is not aligned with respect to the alignment axis, the inductive power transmitter may produce a magnetic field to stimulate alignment of the inductive power receiver along the alignment axis. In the alternative, upon determining that the inductive power receiver is aligned along the alignment axis, the method may continue by enabling the inductive power transmitter to wirelessly pass power to the inductive power receiver.

Other embodiments may include a configuration in which a magnetic field produced by the inductive power transmitter is configured to attract the inductive power receiver toward the magnetic coil of the inductive power receiver, and thus potentially into alignment along the alignment axis. In the alternative, the magnetic field may be configured to repel the inductive power receiver from the inductive power transmitter. In many examples, the magnetic field may be excited by within the inductive power transmitter for a selected duration by a direct current pulse. In some examples, the amplitude of the magnetic field may be selected to overcome the coefficient of static friction between the inductive power transmitter and inductive power receiver.

Additional embodiments include a configuration in which the inductive power receiver and transmitter each include a magnetic field source, such as a permanent magnet. In these examples, the magnetic field sources may be positioned and oriented respectively within the inductive power receiver and the inductive power transmitter to mutually attract and stimulate alignment of the inductive power receiver and inductive power transmitter along the alignment axis. For such embodiments, the magnetic field produced by the inductive power transmitter may attract the permanent magnetic field source within the inductive power receiver. In some examples, the amplitude of the magnetic field is selected to overcome the mutual attraction between first and second magnetic field sources such that the inductive power receiver and inductive power transmitter may, at least temporarily, separate.

Other embodiments described herein may relate to, include, or take the form of a method of aligning an inductive power transmitter with an inductive power receiver, including at least the steps of receiving a signal that the inductive power receiver may be not aligned along an alignment axis with the inductive power transmitter. The method may continue by, upon receiving the signal, enabling the inductive power transmitter to produce a magnetic field to stimulate alignment of the inductive power receiver along the alignment axis.

Still further embodiments described herein may relate to, include, or take the form of a method of physically disconnecting an inductive power receiver from an inductive power transmitter, including at least the steps of receiving a signal at the inductive power transmitter that the inductive power receiver may be prepared to be disconnected from the inductive power transmitter, and upon receiving the signal, enabling the inductive power transmitter to produce a magnetic field to repel the inductive power receiver from the inductive power transmitter.

Other embodiments described herein may relate to, include, or take the form of an inductive charging system including at least an inductive charging device including at least a housing with an interface surface for receiving an electronic device, and a transmit coil within the housing and positioned below the interface surface, wherein the inductive charging device may be configured to apply a direct current to the transmit coil to attract a magnetic field source included within the electronic device to align a receive coil within the electronic device with the transmit coil. In some embodiments, the inductive charging device may be configured to repel a magnetic field source included within the electronic device.

BRIEF DESCRIPTION OF THE FIGURES

Reference will now be made to representative embodiments illustrated in the accompanying figures. It should be understood that the following descriptions are not intended to limit the disclosure to one particular embodiment. To the contrary, it is intended to cover alternatives, modifications, and equivalents as may be included within the spirit and scope of the described embodiments as defined by the appended claims.

The use of the same or similar reference numerals in different drawings indicates similar, related, or identical items.

DETAILED DESCRIPTION

Embodiments described herein may relate to, include, or take the form of methods and systems for aligning a power-transmitting inductor with a power-receiving inductor.

An inductive power transfer system typically includes an inductive power-transmitting component or device to transmit power and an inductive power-receiving component or device to receive power. In some examples, a battery-powered electronic device includes an inductive power-receiving component configured to charge one or more internal batteries. Example battery-powered electronic devices may include media players, media storage devices, personal digital assistants, tablet computers, cellular telephones, laptop computers, smart phones, styluses, global positioning sensor units, remote control devices, wearable devices, electric vehicles, home appliances, location tracking devices, medical devices, health devices, sports devices, accessory devices, and so on. Example inductive power transmitting devices may include docks, stands, clips, plugs, mats, attachments, and so on.

In many examples, a battery-powered electronic device (also called an "accessory") may be positioned on a power-transmitting device or surface (also referred to as a "dock"). In these systems, an electromagnetic coil within the dock (a "transmit coil") may produce a time-varying electromagnetic flux to induce a current within an electromagnetic coil within accessory (a "receive coil"). In other examples, a transmit coil may produce a static electromagnetic field and may physically move, shift, or otherwise change its position to produce a spatially-varying electromagnetic flux to induce a current within the receive coil.

The accessory may use the received current to replenish the charge of a rechargeable battery or to provide power to operating components. In other words, when the accessory is positioned on the dock, the dock may wirelessly transmit power via the transmit coil to the receive coil of the accessory.

In many cases, the dock may provide sustained power transmission to the accessory for a selected or otherwise limited time. For example, the dock may suspend sustained power transmission once the rechargeable battery of the accessory is replenished. In other examples, the dock may be configured to vary the amount of power transmitted to the accessory in response to changes in the power requirements of the accessory. For example, the dock may use information received or measured from the accessory to dynamically, intelligently, and rapidly adjust the power transmitted to the accessory.

In many examples, a transmit coil and receive coil are substantially annular, positioned along a mutual axis (such as the alignment axis) and oriented to face one another. If positioned off the mutual axis, the power transfer efficiency may decrease as a result of the lower density of magnetic flux passing through the receive coil.

In many circumstances, decreased power transfer efficiency is undesirable. For example, the accessory may receive less power than required to charge an internal battery at an optimal rate. To account for misaligned transmit and receive coils, certain inductive power transfer systems may increase the power to the transmit coil in order to increase the power received by the receive coil. In these examples, the power lost due to transfer inefficiencies are typically dissipated as heat and/or may be absorbed by (or may interfere with) other electronic devices or components nearby.

Other designs may require a user to manually adjust the alignment. In these examples, the dock may not transfer power unless and until the user realigns the dock and accessory. In still further examples, an accessory may ignore power transfer efficiency losses resulting from misalignment and instead may charge an internal battery at a lower rate. In these examples, a user may be frustrated or inconvenienced due to inconsistent accessory recharge times.

In other examples, an accessory and dock may include one or more complementary magnetic field sources to facilitate proper alignment. More particularly, a magnet may be positioned at or near a center of the receive coil within the accessory and, correspondingly, another magnet may be positioned at or near a center of the transmit coil within the dock. The two alignment magnets may be mutually attracted when the accessory is placed proximate the dock or, in the alternative, when the dock is placed proximate the accessory. However, in some cases, the mutually attractive forces of the alignment magnets may not overcome the static friction between the interfacing surfaces of the dock and accessory. In other words, the mutual attraction of the alignment magnets may forcibly hold the dock and accessory in a misaligned configuration. In many examples, the attractive force between the alignment magnets may increase the coefficient of static friction between the interfacing surfaces of the dock and accessory. For example, materials selected for the dock and accessory may have a first coefficient of static friction between them in the absence of alignment magnets and may have a second coefficient of static friction between them in the presence of alignment magnets.

Accordingly, embodiments described herein may relate to, include, or take the form of methods and apparatuses for aligning a power-transmitting inductor with a power-receiving inductor. In many examples, the methods and apparatuses described herein may utilize the transmit and/or receive coils as static magnetic field sources in order to more perfectly align the two along a mutual axis (an "alignment axis").

In one embodiment, if a dock determines that an accessory is not aligned on the alignment axis, the dock may apply a direct current to the transmit coil to excite an electromagnetic field from the transmit coil. The electromagnetic field may be configured to attract or repel one or more magnetic or electromagnetic field sources within the misaligned accessory. For example, in one embodiment, the electromagnetic field may attract the one or more alignment magnets within the accessory. In another example, the electromagnetic field may attract a ferromagnetic material within the accessory, such as a steel plate. In still further examples, the accessory may also excite an electromagnetic field to attract or repel the electromagnetic field produced by the dock. In this manner, the accessory may be encouraged to align along the alignment axis.

In still further examples, the dock and/or accessory may produce an electromagnetic field in order to overcome static friction at the interface between the dock and the accessory. More specifically, as mentioned above, a dock and accessory may each include complementary alignment magnets that may, in certain circumstances, forcibly hold the dock and accessory in a misaligned configuration. In such a case, the dock and/or accessory may produce an electromagnetic field of sufficient strength to overcome the mutually attractive forces between the alignment magnets. In this manner, the electromagnetic field may slightly repel the dock from the accessory, or the accessory from the dock. As a result of the repelling force, the coefficient of static friction between the dock and accessory may be reduced (in some cases to zero) such that the static frictional force between the dock and accessory can be overcome, allowing the alignment magnets to once again attempt to align the dock and accessory along the alignment axis.

In other examples, the accessory or dock may individually include a magnetic field source such as a permanent magnet. In such a case, the dock and/or accessory may produce an electromagnetic field of sufficient strength to repel the permanent magnet. As described above, the coefficient of static friction between the dock and accessory may be reduced, affecting the preferred alignment of the dock and accessory.

In further embodiments, the alignment magnets may be controllable in order to reduce the mutual attraction therebetween. For example, the alignment magnets may be electromagnets that may optionally turned on or off. In other examples, the alignment magnets may be retractable from the interface surfaces of the dock and accessory such that the influence of mutual attraction between them is reduced. In still further embodiments, a shield element may be selectively inserted between the alignment magnets and the interface surface. For example, a shield element may be configured to controllably slide between an alignment magnet within the dock and the interface surface. In this manner, the influence of mutual attraction between the alignment magnets is reduced.

In these and other example embodiments, the dock and/or accessory may excite the magnetic field for a fixed duration, periodically, or only temporarily (for example, by outputting a single pulse or short series of pulses). In certain embodiments, the strength of the magnetic field may have fixed amplitude, although this is not required. In certain embodiments the strength of the magnetic field may be excited to varying amplitude by, for example, an alternating current.

Figure 1:
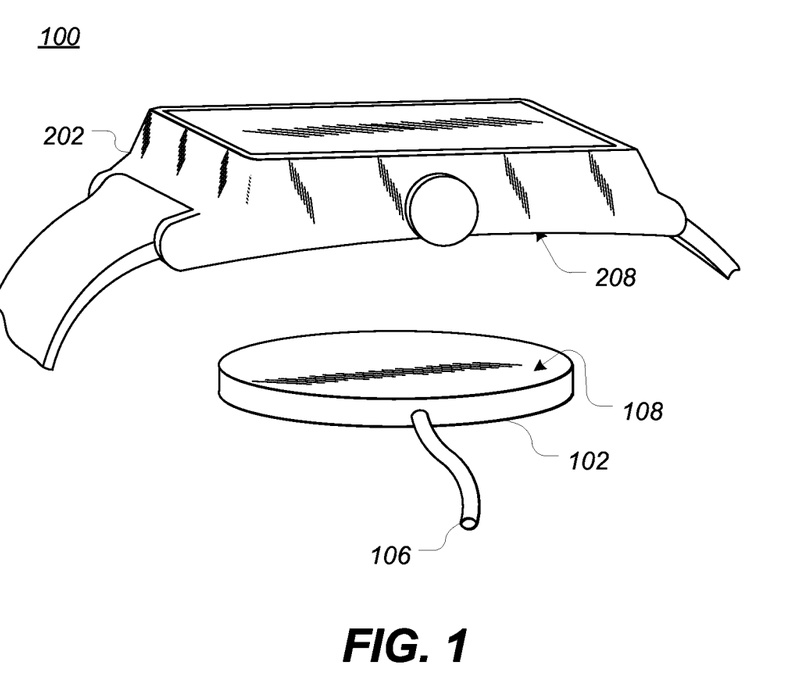
FIG. 1 depicts a front perspective view of an example inductive power transfer system in an unmated configuration.

FIG. 1 depicts a front perspective view of an example inductive power transfer system in an unmated configuration. The illustrated embodiment shows an inductive power transmitter dock that is configured to couple to and wirelessly pass power to an inductive power receiver accessory such as a portable electronic device or wearable accessory.

The wearable accessory, such as depicted in FIG. 1, may be configured to provide time- and/or health-related information or data such as but not limited heart rate data, blood pressure data, temperature data, oxygen level data, diet/nutrition information, medical reminders, health-related tips or information, the current time, calendar appointments, and so on.

A wearable accessory may include a coupling mechanism to connect a strap or band useful for securing to a user. For example, a smart watch may include a band or strap to secure to a user's wrist. In another example, a wearable health assistant may include a strap to connect around a user's chest, or alternately, a wearable health assistant may be adapted for use with a lanyard or necklace. In still further examples, a wearable device may secure to or within another part of a user's body. In these and other embodiments, the strap, band, lanyard, or other securing mechanism may include one or more electronic components or sensors in wireless or wired communication with the accessory. For example, the band secured to a smart watch may include one or more sensors, an auxiliary battery, a camera, or any other suitable electronic component.

In many examples, a wearable device, such as depicted in FIG. 1, may include a processor coupled with or in communication with a memory, one or more communication interfaces, output devices such as displays and speakers, and one or more input devices such as buttons, dials, microphones, or touch-based interfaces. The communication interface(s) can provide electronic communications between the communications device and any external communication network, device or platform, such as but not limited to wireless interfaces, Bluetooth interfaces, Near Field Communication interfaces, infrared interfaces, USB interfaces, Wi-Fi interfaces, TCP/IP interfaces, network communications interfaces, or any conventional communication interfaces. The wearable device may provide information regarding time, health, statuses or externally connected or communicating devices and/or software executing on such devices, messages, video, operating commands, and so forth (and may receive any of the foregoing from an external device), in addition to communications.

Although the system 100 illustrated in FIG. 1 depicts a wristwatch or smart watch, any electronic device may be suitable to receive inductive power from an inductive power transmitting dock. For example, a suitable electronic device may be any portable or semi-portable electronic device that may receive inductive power, and a suitable dock device may be any portable or semi-portable docking station that may wirelessly transmit inductive power.

Accordingly, the system 100 may include an inductive power transmitter 102 and an inductive power receiver 202. The inductive power transmitter 102 and the inductive power receiver 202 may each respectively include a housing to enclose electronic components therein. In many examples, and as depicted, the inductive power receiver 202 may be larger than that of the inductive power transmitter 102, although such a configuration is not required. In other examples, the inductive power transmitter 102 may be larger than the inductive power receiver 202. In still further examples, the size of the two devices may be substantially the same.

In the illustrated embodiment, the inductive power transmitter 102 may be connected to mains power (such as an alternating current power outlet) by power cord 106. In other embodiments, the inductive power transmitter 102 may be battery operated. In still further examples, the inductive power transmitter 102 may include a power cord 106 and an internal or external battery. Similarly, although the embodiment is depicted is shown with the power cord 106 coupled to the housing of the inductive power transmitter 102, the power cord 106 may be connected by any suitable means. For example, the power cord 106 may be removable and may include a connector that is sized to fit within an aperture or receptacle opened within the housing of the inductive power transmitter 102.

Figure 2:
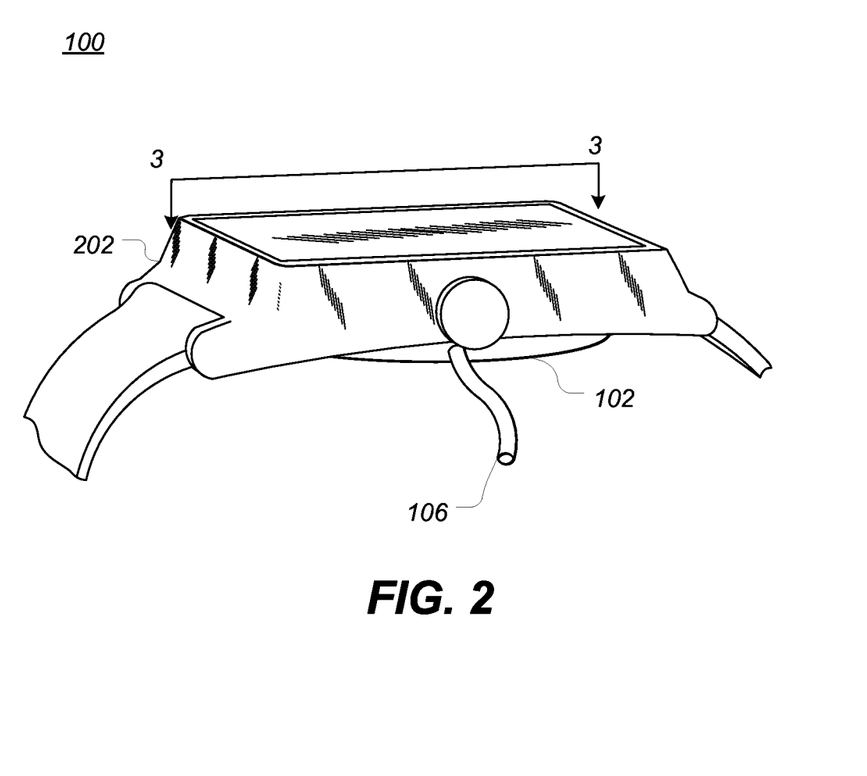
FIG. 2 depicts the example inductive power transfer system of FIG. 1 in a mated configuration.

As shown, the inductive power receiver 202 may include a lower surface 208 that may interface with, align or otherwise contact an interface surface 108 of the inductive power transmitter 102. In this manner, the inductive power receiver 202 and the inductive power transmitter 102 may be positionable with respect to each other. In certain embodiments, the interface surface 108 may be configured in a particular shape that mates with a complementary shape of the inductive power receiver 202, for example as shown in FIG. 2. For example the interface surface 108 may include a concave shape that follows a selected curve. The bottom surface 208 of the inductive power receiver 202 may include a convex shape following the same or substantially similar curve as the interface surface 108. In other examples, the interface surface 108 may be substantially flat.

Figure 3A:
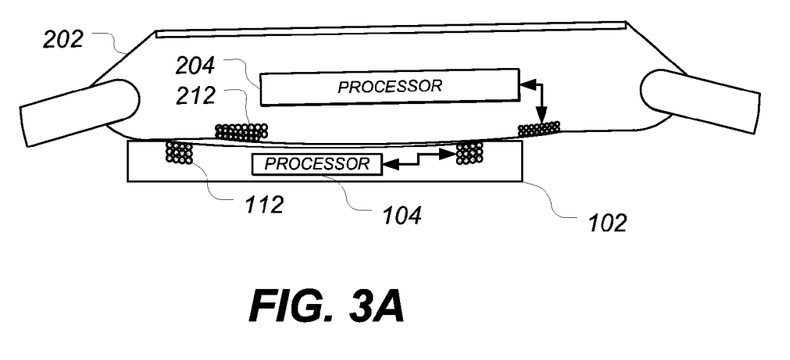
FIG. 3A depicts a side cross-section view taken along line 3-3 of FIG. 2, showing the example inductive power transfer system in a misaligned configuration.

FIG. 3A depicts a simplified cross-section view taken along line 3-3 of FIG. 2, showing the example inductive power transfer system in a misaligned configuration. It should be appreciated that many components of embodiments of both the inductive power receiver 202 and inductive power transmitter 102 are omitted for clarity. Likewise, the positions of the elements that are shown are meant to be illustrative rather than necessarily portraying a particular size, shape, scale, position, or relation to one another (although some embodiments may have elements with one or more of such factors as illustrated).

As illustrated, the bottom surface 208 inductive power receiver 202 is partially contacting the interface surface 108 of the inductive power transmitter 102. As previously discussed, the inductive power receiver 202 may include one or more electronic components within its housing. Continuing the example of the accessory of FIG. 3A, the inductive power receiver 202 may include a receive coil 212 having one or more windings. The receive coil 212 may receive power from the inductive power transmitter 102 and may pass the received power to a processor 204. The processor 204 may use the received power to perform or coordinate one or more functions of the inductive power receiver 202 and/or to replenish the charge of a battery within the inductive power receiver 202. Similarly, the inductive power transmitter 102 may also include a transmit coil 112 having one or more windings. The transmit coil 112 may transmit power to the inductive power receiver 202. A processor 104 may be used to perform or coordinate one or more functions of the inductive power transmitter 102.

As noted above, power transfer efficiency between the inductive power transmitter 102 and the inductive power receiver 202 is optimized when the receive coil 212 is aligned with the transmit coil 112. In many examples, and as shown in FIG. 3A, a slight misalignment of the inductive power transmitter 102 and the inductive power receiver 202 may result in a substantial misalignment of the transmit coil 112 and receive coil 212 which may, in turn, substantially reduce the power transfer efficiency therebetween. Generally, the inductive power transmitter 102 and the inductive power receiver 202 are aligned along a mutual axis, such as an alignment axis 300, for example as shown in FIG. 3B.

Figure 3B:
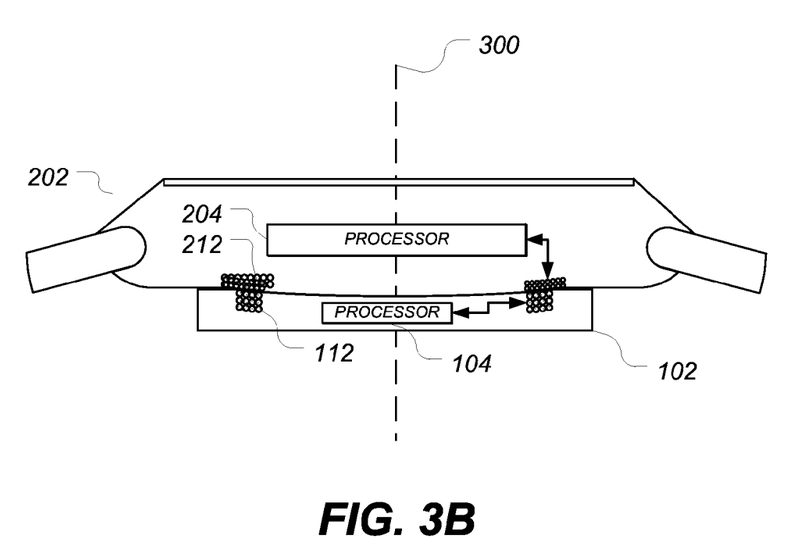
FIG. 3B depicts a side cross-section view taken along line 3-3 of FIG. 2, showing the example inductive power transfer system in an aligned configuration.

In order to achieve the alignment as shown in FIG. 3B, the inductive power transmitter apply a direct current to the transmit coil 112 to excite an electromagnetic field from the transmit coil 112. The electromagnetic field may be configured to attract or repel one or more magnetic or electromagnetic field sources within the misaligned inductive power receiver 202. For example, in one embodiment, the electromagnetic field may attract the one or more alignment magnets (not shown) within the inductive power receiver 202. In another embodiment, the electromagnetic field may attract a ferromagnetic material within the inductive power receiver 202. For example, the housing of the inductive power receiver may be at least partially made from steel or another ferromagnetic material. In other examples the electromagnetic field may attract an electromagnetic field produced by the receive coil 212.

As a result of the attraction provided between the electromagnetic field and the inductive power receiver 202, the inductive power receiver 202 may move to follow the geometry of the interface surface 108 to achieve alignment along the alignment axis 300, as shown in FIG. 3B.

In another embodiment, the inductive power transmitter 102 may also generate an electromagnetic field in the transmit coil 112 to repel a magnetic field associated with the inductive power receiver 202. For example the electromagnetic field may repel the field produced by one or more alignment magnets (not shown), as mentioned above. In other examples the electromagnetic field may repel an electromagnetic field produced by the receive coil 212. For example, the receive coil 212 may produce a static magnetic field that opposes a static magnetic field produced by the transmit coil 112.

In certain embodiments, the inductive power transmitter 102 may apply a pulsed direct current to the transmit coil 112 in order to generate a pulsed electromagnetic field. Such a field may briefly repel or attract the inductive power receive 202 as described above. A pulse or a series of pulses may agitate the inductive power receiver 202, thereby moving it and eliminating static friction between the interface surface 108 and the bottom surface 208, leaving kinetic friction between the two. As kinetic friction between two bodies is generally less than static friction between the same two bodies, the inductive power receiver 202 may more easily slide or otherwise move into alignment with the inductive power transmitter 102.

Figure 4:
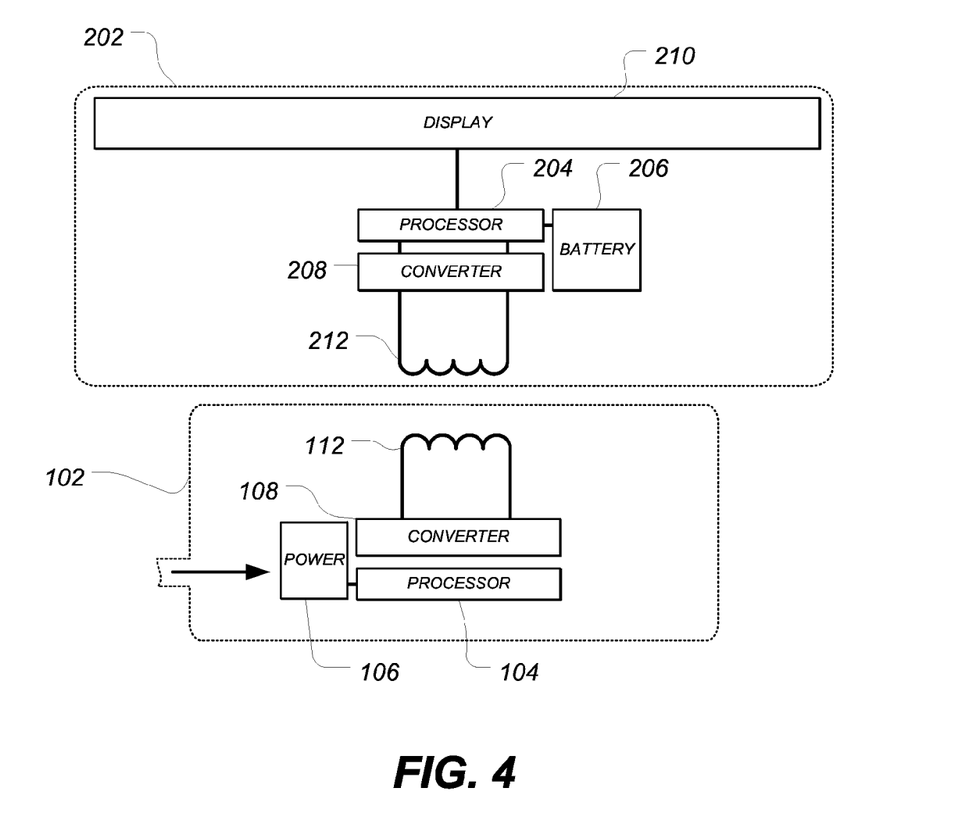
FIG. 4 depicts a simplified signal flow block diagram of a sample inductive power transfer system.

As a result of the repulsion between the electromagnetic field and the inductive power receiver 202, the inductive power receiver 202 is encouraged to follow the geometry of the interface surface 108 to achieve alignment along the alignment axis 300, as shown in FIG. 3B. In these examples, the repulsion between the electromagnetic field and the inductive power receiver 202 may reduce the coefficient of static friction between the interfacing surfaces of the inductive power transmitter 102 and the inductive power receiver 202 so that the alignment features, such as alignment magnets or complementary geometry, may FIG. 4 depicts a simplified signal flow block diagram of a sample inductive power transfer system. The inductive power transfer system may include an inductive power transmitter 102 and an inductive power receiver 202 separated by an air gap. The inductive power receiver 202 is depicted positioned on a top surface of the inductive power transmitter 102, although such a configuration is not required.

The inductive power transmitter 102 may include a clock connected to a processor 104 and a direct current converter 108. The clock can generate one or more timing signals for the inductive power transfer system. The processor 104 may be coupled to a power supply 106 such as a direct current power supply. In certain embodiments, the processor 104 may control the state of the direct current converter 108, which has power input from the power supply 106. In one embodiment, the clock generates periodic signals that are used by the processor 104 to activate and deactivate switches in the direct current converter 108. The switches may convert the direct current from the power supply 106 to alternating current suitable for exciting a transmit coil 112.

In these embodiments, the transmitter 102 of the inductive power transfer system may be configured to provide a time-varying signal to the transmit coil 112 in order to induce a voltage within the receive coil 212 in the receiver through inductive coupling with the transmit coil 112. In this manner, power may be transferred from the transmit coil 112 to the receive coil 212. The signal produced in the receive coil 212 may be received by a direct current converter 208 that converts the signal into a direct current signal that may be used to replenish a battery 206. Any suitable direct current converter 208 can be used in the inductive power transfer system. For example, in one embodiment, a rectifier may be used as a direct current converter. A programmable load such as a processor 204 may then receive the direct current signal. The processor 204 may perform or coordinate one or more functions of the inductive power receiver 202. For example, the processor 204 may couple to and control a display 210 and a battery 206.

Figure 5:
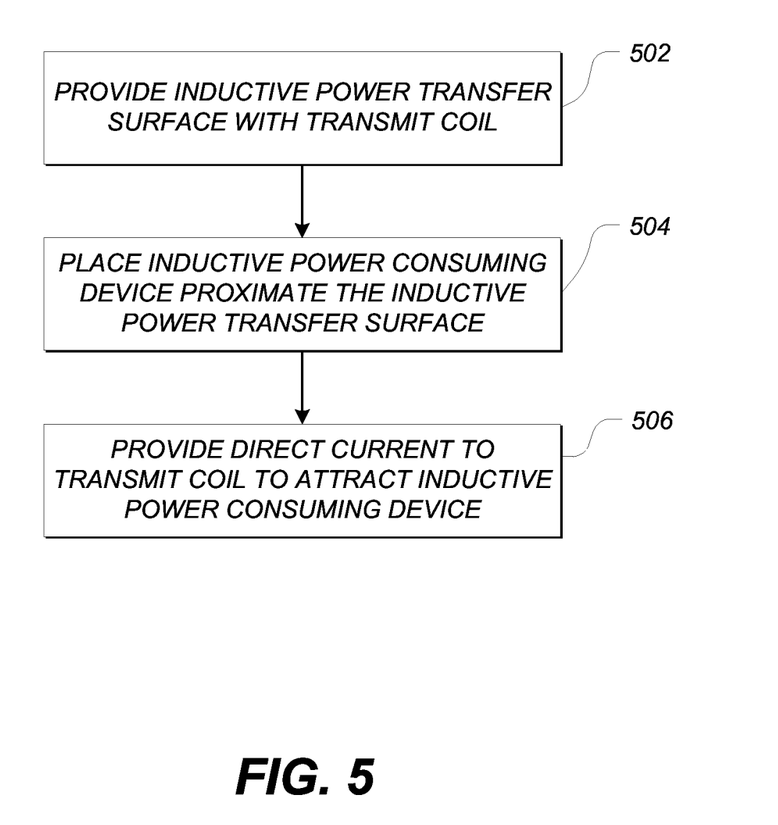
FIG. 5 depicts a flow chart illustrating example steps of a method of aligning a transmit coil with an inductive power accepting device.

FIG. 5 depicts a flow chart illustrating example operation of a method of aligning a transmit coil with an inductive power accepting device. At 502, the inductive power accepting device may be placed on an inductive power transmit surface. The surface may be configured, shaped, or otherwise adapted to receive and wireless transfer power to an inductive power consuming device. At operation 504, a direct current may be applied to the transmit coil in order to induce an electromagnetic field to attract the inductive power consuming device. In this manner, the inductive power consuming device may be drawn into alignment with the transmit coil.

Figure 6:
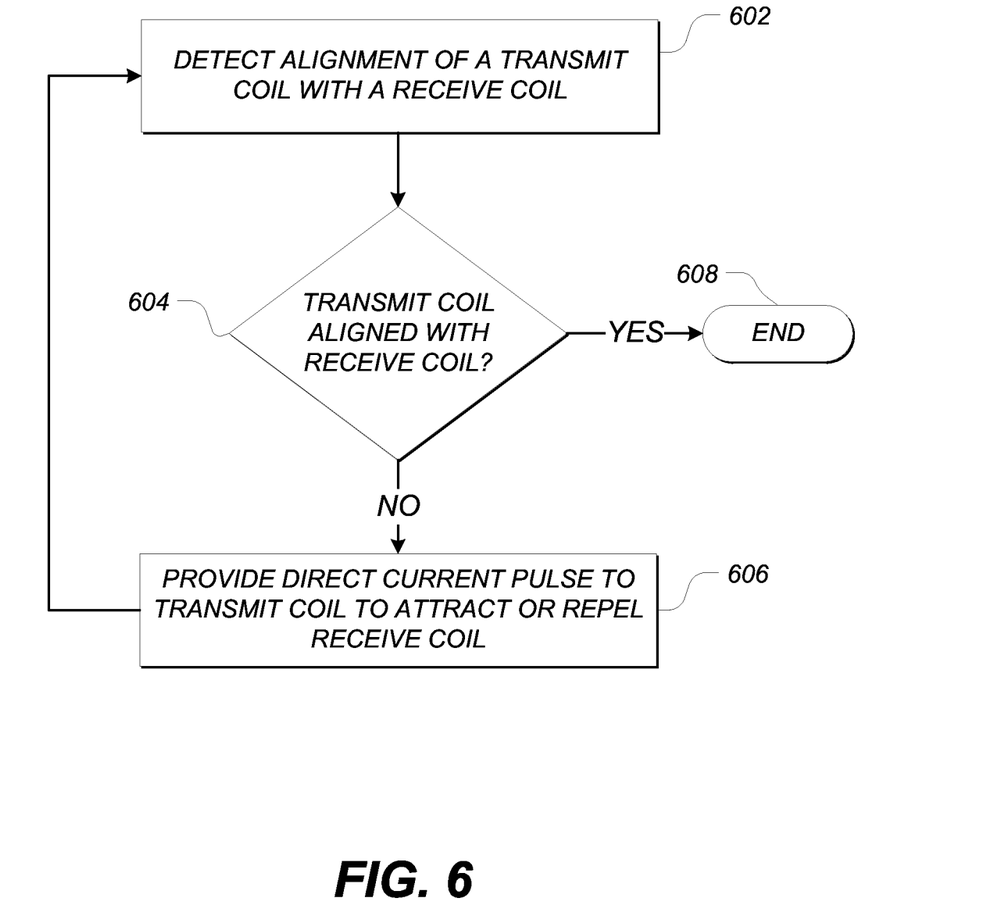
FIG. 6 depicts a flow chart illustrating example steps of a method of aligning a transmit coil with an inductive power accepting device.

FIG. 6 depicts a flow chart illustrating example operations of a method of aligning a transmit coil with an inductive power accepting device. The method may begin at 602 with an inductive power transmitter detecting the alignment with a transmit coil. If the receive coil is aligned with the transmit coil, the method may terminate at 608. However, if the receive coil is not aligned with the transmit coil, a direct current pulse may be applied to the transmit coil to attract or repel the receive coil at 606. A pulse or a series of pulses may agitate the alignment of the receive coil to overcome the coefficient of static friction present between the receive coil and the transmit coil. In this manner, with reduced friction, the receive coil may slide, shift, or move into alignment with the transmit coil. Thereafter, the method may return to operation 602 to detect the alignment of the receive coil with respect to the transmit coil.

Figure 7:
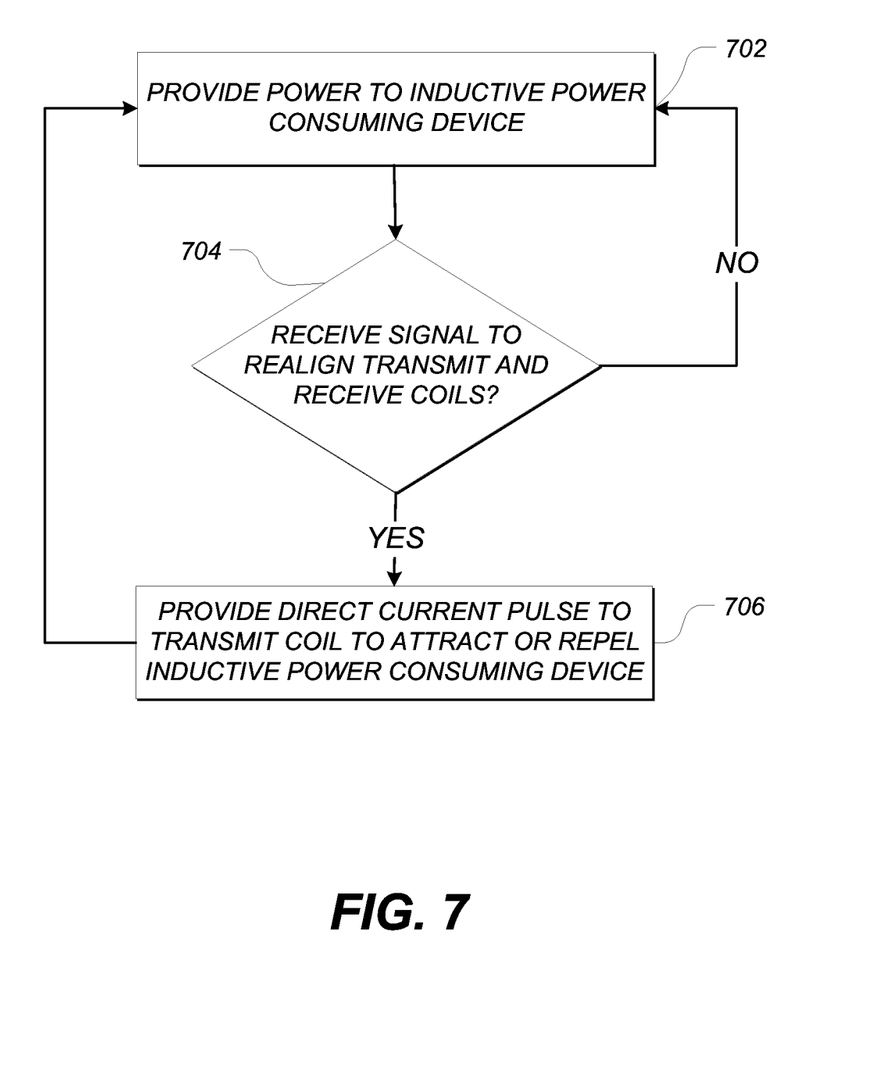
FIG. 7 depicts a flow chart illustrating example steps of a method of aligning a transmit coil with an inductive power accepting device.

FIG. 7 depicts a flow chart illustrating example operations of a method of aligning a transmit coil with an inductive power accepting device. The method may begin at 702 by providing inductive power to an inductive power consuming device across an inductive power transfer interface. At operation 704, a signal may be received requesting to realign transmit and receive coils associated with the inductive power interface. If a signal is not received, operation 702 may be continued. If, however, a realignment signal is received, a direct current pulse may be applied to the transmit coil to attract or repel the receive coil at 706. A pulse or a series of pulses may agitate the alignment of the receive coil to overcome the coefficient of static friction present between the receive coil and the transmit coil. In this manner, with reduced friction, the receive coil may slide, shift, or move into alignment with the transmit coil. Thereafter, the method may return to operation 702.

Figure 8:
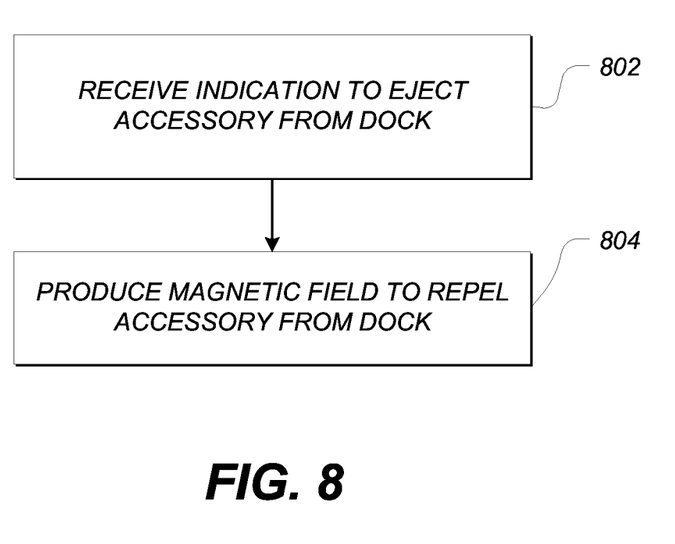
FIG. 8 depicts a flow chart illustrating example steps of a method of ejecting an inductive power accepting device from an inductive power transmitting device.

FIG. 8 depicts a flow chart illustrating example operations of a method of ejecting an inductive power accepting device from an inductive power transmitting device. The method may begin at operation 802 by receiving an indication, such as a signal, to eject an accessory from a dock. Once the signal is received, either or both of the accessory or dock may produce a magnetic field adapted to repel the other at 804. For example, an accessory may receive an indication that the user desires to separate the dock from the accessory. The accessory may apply a direct current pulse to the receive coil in order to repel the dock away from the accessory. Similarly, the dock may receive an indication that the accessory desires to separate from the dock. The dock may then apply a direct current pulse to the transmit coil in order to repel the accessory away from the dock.

In the present disclosure, the methods disclosed, or individual operations thereof, are described with reference to an inductive power transmitter activating circuitry, electromagnetic fields, or other components to realign an inductive power receiver therewith. However, this configuration is not necessary. In many embodiments an inductive power receiver may perform the operations of the methods described herein to realign itself with respect to an inductive power transmitter. In other embodiments, an inductive power receiver may cause the inductive power transmitter to realign with the inductive power receiver.

In the present disclosure, the methods disclosed, or individual operations thereof, may be implemented as sets of instructions or software readable by a device either sequentially or. Further, it is understood that the specific order or hierarchy of operations in the methods disclosed are examples of sample approaches. In other embodiments, the specific order or hierarchy of operations in the method can be rearranged while remaining within the disclosed subject matter. The accompanying method claims present elements of the various operations in a sample order, and are not necessarily meant to be limited to the specific order or hierarchy presented.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

We claim:

1. A method of aligning an inductive power transmitter with an inductive power receiver, comprising:
   determining if the inductive power receiver is aligned with respect to the inductive power transmitter by receiving a signal from the inductive power receiver;
   upon determining that the inductive power receiver is not aligned with respect to the alignment axis, producing a series of magnetic field pulses that repel the inductive power receiver to stimulate alignment of the inductive power receiver along the alignment axis; and
   otherwise, wirelessly transmitting power to the inductive power receiver.

2. The method of claim 1, wherein the magnetic field facilitates alignment of the inductive power receiver with respect to the inductive power transmitter.

3. The method of claim 1, wherein the magnetic field repels the inductive power receiver from the inductive power transmitter.

4. The method of claim 1, wherein a force of the magnetic field is selected to overcome a static friction between the inductive power transmitter and inductive power receiver.

5. The method of claim 1, wherein the magnetic field is generated for a selected duration.

6. The method of claim 1, wherein the magnetic field is generated by a direct current pulse.

7. The method of claim 1, wherein upon determining that the inductive power receiver is not aligned along the alignment axis, enabling the inductive power receiver to produce a second magnetic field to stimulate alignment of the inductive power receiver along the alignment axis.

8. A method of aligning an inductive power transmitter with an inductive power receiver, comprising:
   receiving a signal at the inductive power transmitter from the inductive power transmitter that the inductive power receiver is not aligned along an alignment axis with the inductive power transmitter;
   upon receiving the signal, enabling the inductive power transmitter to produce a series of magnetic field pulses that repel the inductive power receiver to stimulate alignment of the inductive power receiver along the alignment axis.

9. The method of claim 8, wherein the magnetic field attracts the inductive power receiver toward alignment along the alignment axis.

10. The method of claim 8, wherein the magnetic field repels the inductive power receiver from the inductive power transmitter.

11. The method of claim 8, wherein the amplitude of the magnetic field is selected to overcome a coefficient of static friction between the inductive power transmitter and inductive power receiver.

12. The method of claim 8, wherein the magnetic field is excited by an electromagnetic coil within the inductive power transmitter.

13. The method of claim 8, wherein upon determining that the inductive power receiver is not aligned along the alignment axis, enabling the inductive power receiver to produce a second magnetic field to stimulate alignment of the inductive power receiver along the alignment axis.

14. A method of disconnecting an inductive power receiver from an inductive power transmitter, comprising:
   receiving a signal at the inductive power transmitter that the inductive power receiver is prepared to be disconnected from the inductive power transmitter; and
   upon receiving the signal, producing a series of magnetic field pulses that repel the inductive power receiver.

15. The method of claim 14, wherein:
   the inductive power receiver further comprises a permanent magnetic field source; and
   wherein the produced magnetic field repels the permanent magnet.

16. The method of claim 14, wherein:
   the inductive power receiver further comprises a first permanent magnetic field source; and
   the inductive power transmitter further comprises a second permanent magnetic field source;
   wherein the first and second magnetic field sources are positioned and oriented respectively within the inductive power receiver and the inductive power transmitter to mutually attract and stimulate alignment of the inductive power receiver and inductive power transmitter along the alignment axis.

17. The method of claim 14, wherein the amplitude of the magnetic field is selected to overcome the mutual attraction between first and second magnetic field sources.

18. An inductive charging system comprising:
   an inductive charging device comprising:
      a housing comprising an interface surface for receiving an electronic device; and
      a transmit coil within the housing and positioned below the interface surface;
   wherein:
      the inductive charging device is configured to apply a series of direct current pulses to the transmit coil that repel a magnetic field source included within the electronic device to cause a receive coil within the electronic device to align with the transmit coil.

19. The inductive charging system of claim 18, further comprising:
   the electronic device comprising a rechargeable battery electrically associated with the receive coil.

20. The inductive charging system of claim 18, wherein the magnetic field source comprises a permanent magnet.

21. The inductive charging system of claim 18, wherein the magnetic field source is produced by the receive coil.

22. An inductive charging system comprising:
   an inductive charging device comprising:
      a housing comprising an interface surface for receiving an electronic device; and
      a transmit coil within the housing and positioned below the interface surface;
   wherein:
      the inductive charging device is configured to apply a series of direct current pulses to the transmit coil that repel a magnetic field source included within the electronic device to align a receive coil within the electronic device with the transmit coil.

23. The inductive charging system of claim 22, further comprising:
   the electronic device comprising a rechargeable battery electrically associated with the receive coil.

24. The inductive charging system of claim 22, wherein the magnetic field source comprises a permanent magnet.

25. The inductive charging system of claim 22, wherein the magnetic field source is produced by the receive coil.

* * * * *